US012680316B2

(12) United States Patent (10) Patent No.: US 12,680,316 B2
Paillot (45) Date of Patent: Jul. 14, 2026

(54) SPORTS FLOORING IN TILE OR PLANK FORM

(71) Applicant: GERFLOR, Lyons (FR)

(72) Inventor: Pierrick Paillot, Lyons (FR)

(73) Assignee: GERFLOR, Lyons (FR)

( * ) Notice: Subject to any disclaimer, the term of this patent is extended or adjusted under 35 U.S.C. 154(b) by 191 days.

(21) Appl. No.: 18/761,864

(22) Filed: Jul. 2, 2024

(65) Prior Publication Data

US 2025/0012094 A1 Jan. 9, 2025

(30) Foreign Application Priority Data

Jul. 4, 2023 (FR) ...................................... 2307124

(51) Int. Cl.
B32B 3/06 (2006.01)
B32B 7/12 (2006.01)
E04F 15/02 (2006.01)
E04F 15/10 (2006.01)

(52) U.S. Cl.
CPC .............. E04F 15/107 (2013.01); B32B 3/06 (2013.01); B32B 7/12 (2013.01); E04F 15/02038 (2013.01); E04F 15/0215 (2013.01); E04F 2290/044 (2013.01)

(58) Field of Classification Search
CPC .......... B32B 7/12; B32B 27/065; E04F 15/22; E04F 15/107; E04F 15/225; E04F 15/02038
See application file for complete search history.

(56) References Cited

U.S. PATENT DOCUMENTS

2020/0198304 A1* 6/2020 Paillot ..................... B32B 5/028
2023/0014999 A1* 1/2023 Dossche ........... E04F 15/02188

FOREIGN PATENT DOCUMENTS

EP 1570143 B1 5/2007
FR 2804976 B1 3/2005
FR 3065670 A1 11/2018

OTHER PUBLICATIONS

Search Report issued in French patent application No. 2307124, dated May 7, 2024.

* cited by examiner

*Primary Examiner* — Elizabeth E Mulvaney
(74) *Attorney, Agent, or Firm* — Knobbe, Martens, Olson & Bear, LLP

(57) ABSTRACT

A sports flooring in the form of a tile or plank with free installation and including coupling with an adjacent tile or plank. The flooring includes successively, from top to bottom, and bonded together: a surface layer including at least one flexible layer with a thickness between 0.3 mm and 1 mm and a compression modulus between 10 MPa and 100 MPa; a rigid intermediate layer with a thickness between 3.5 mm and 7 mm and a flexural modulus between 1000 MPa and 10,000 MPa, and a compression modulus between 35 MPa and 300 MPa; a shock-absorbing underlayer with a thickness greater than 3 mm, typically between 3 mm and 10 mm, and preferably between 5 mm and 10 mm, and a compression modulus between 0.5 MPa and 15 MPa.

14 Claims, 3 Drawing Sheets

[Fig. 1]
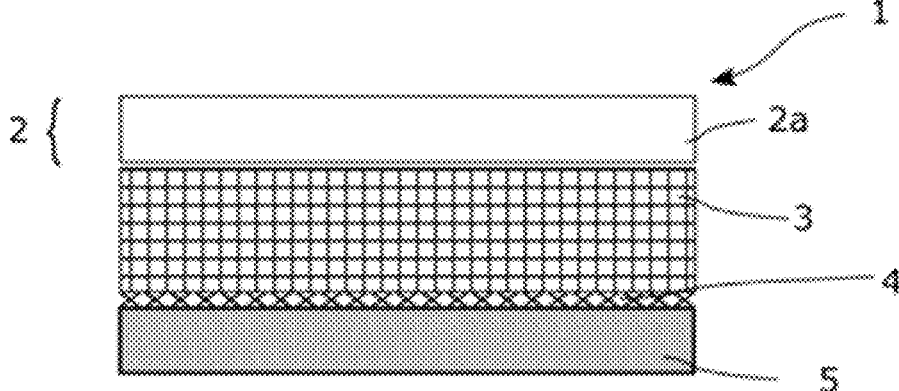
[Fig. 2]
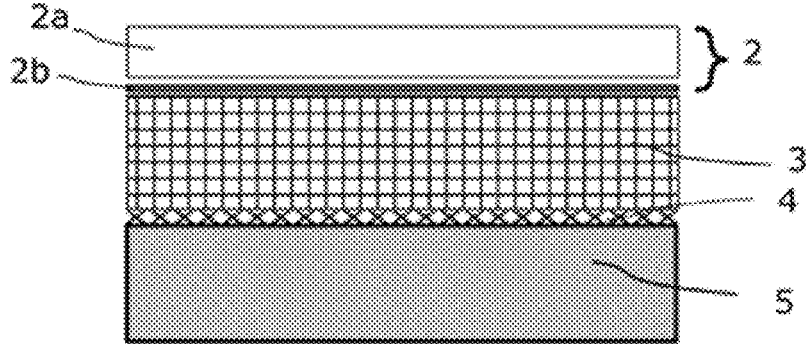
[Fig. 3]
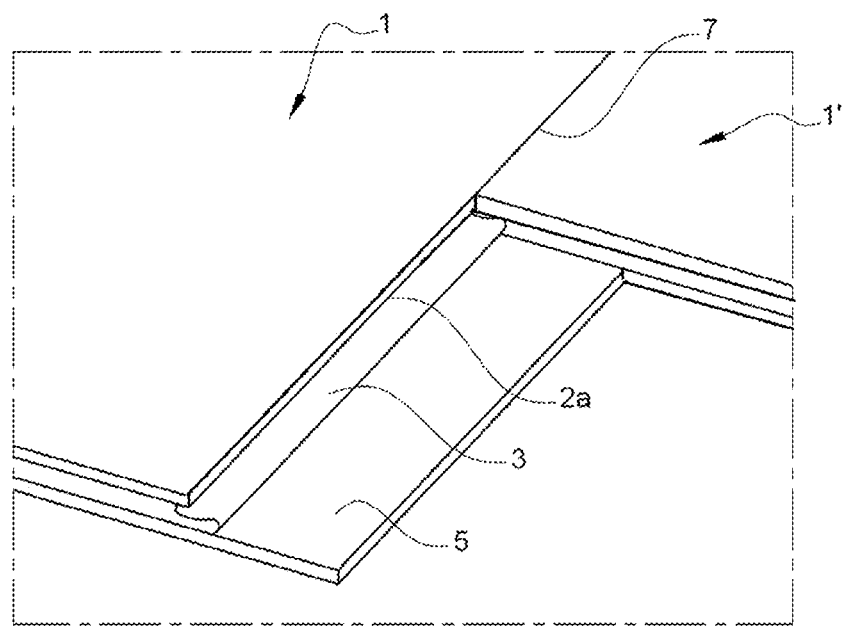

[Fig. 4]
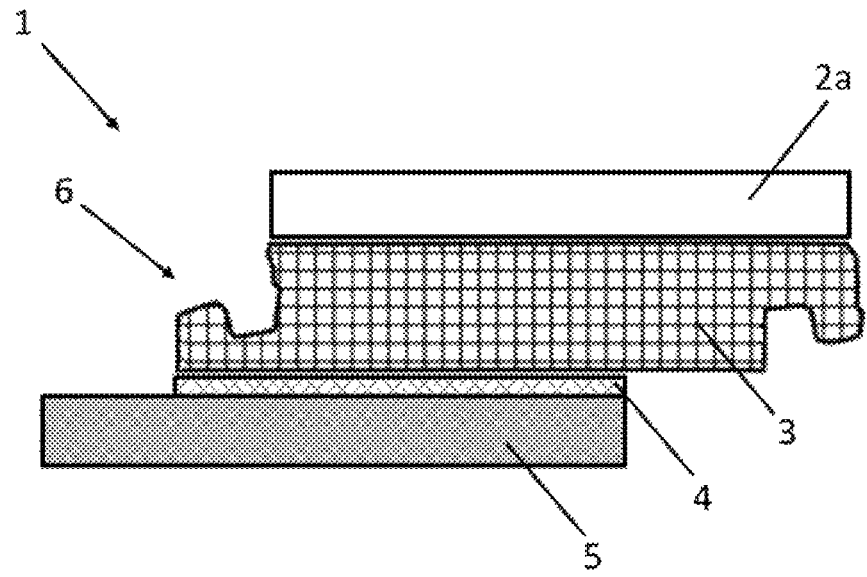
[Fig. 5]
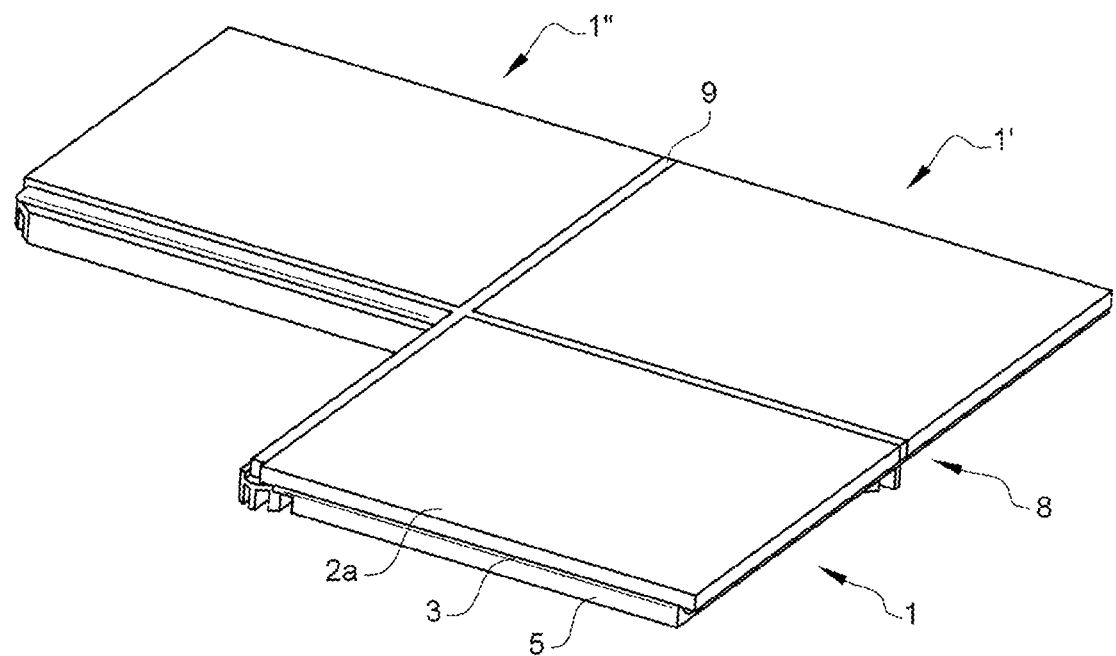

[Fig. 6]
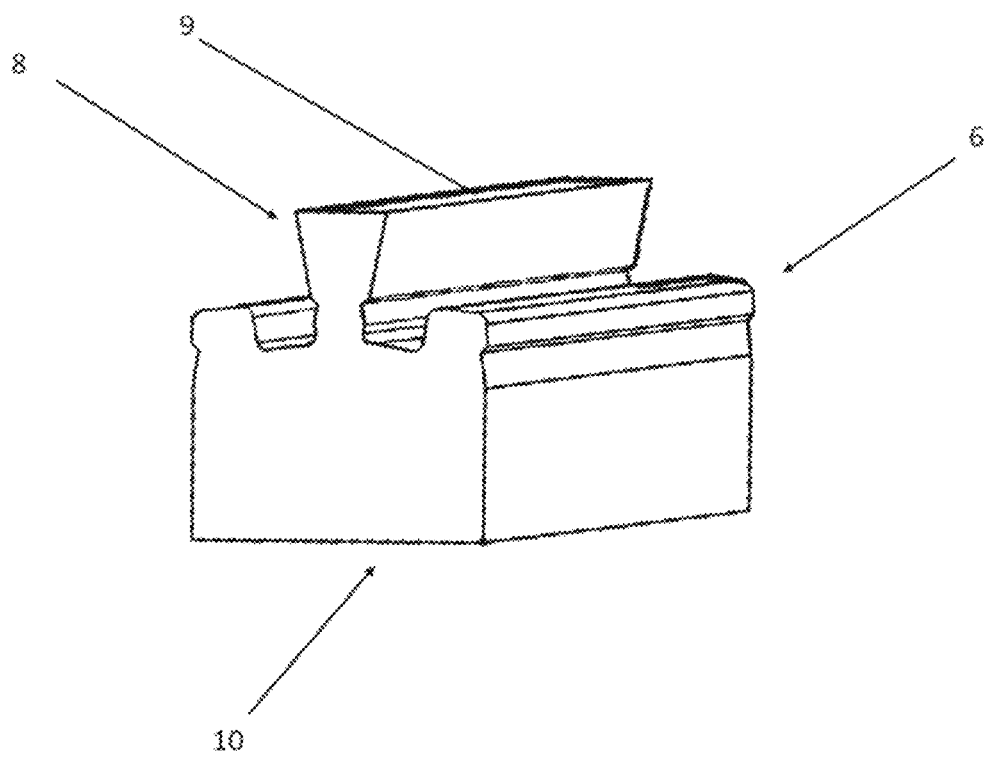
[Fig. 7]
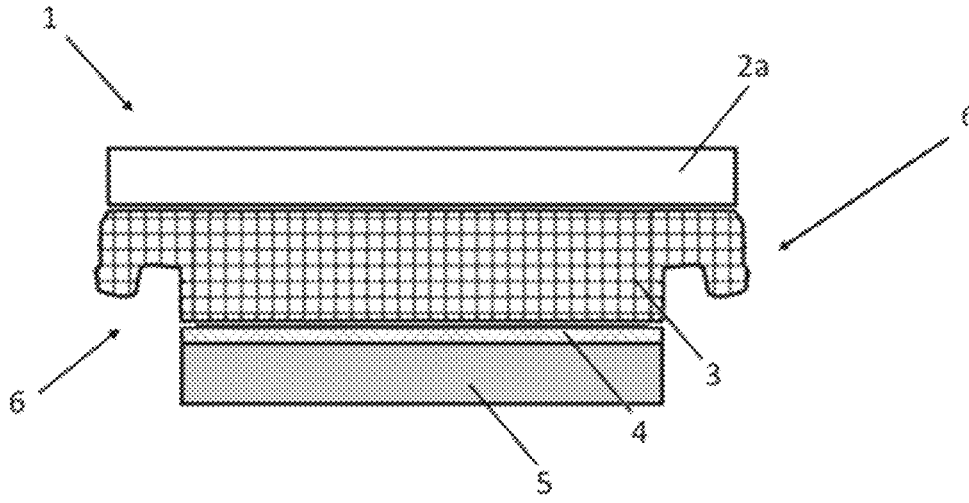

SPORTS FLOORING IN TILE OR PLANK FORM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD

The present invention relates to a multilayer structure for creating a so-called "sports" flooring, intended for sports halls, gymnasiums, multi-purpose gyms, or similar facilities.

BACKGROUND

A sports flooring must ensure the safety and protection of the user, particularly in terms of shock absorption according to EN 14808 standard. A so-called "point elastic" sports flooring must specifically meet the NF EN 14904 standard of June 2006, which states that the flooring must absorb 25% of shocks, measured according to EN 14808 standard.

Generally, a sports floor consists of a multilayer structure including an upper wear layer whose main functions are to control slipperiness, resist wear, ease of cleaning, and decorative appearance, bonded to a backing layer of polyvinyl chloride foam with a density generally between 0.30 and 0.40 and a thickness usually between 4 and 9 mm, allowing the absorption of point shocks.

However, in practice, this type of flooring is often installed in so-called multipurpose gymnasiums, which can host non-sporting events that may degrade the flooring.

Indeed, the backing foam is subject to traffic, heavy loads, or unforeseen impacts that can cause irreversible deformations and damage the flooring. While sports flooring is excellent for absorbing point shocks, it is less effective in resisting the aforementioned stresses.

Document WO2018/197543 is known to address the versatility problem of venues where the flooring is laid by placing a polymer film between a surface layer and a polyvinyl chloride foam backing layer, the film having a stiffness greater than 100 N/mm and a Young's modulus greater than 1.5 GPa, to limit indentation phenomena in the foam by better distributing stresses and reducing shear effects on the foam cell walls, corresponding to perpendicular deformation to the punch penetration.

This type of sports flooring fully satisfies the user in terms of safety and protection. However, it has some inherent disadvantages, as the foam layer, which allows the absorption of point shocks, is designed to be glued to the floor.

The glued installation technique is long and tedious, and when these floors are laid without glue, it results in problems of deformation, bulging, slipping, or joint opening between two flooring structures, especially due to expansion/contraction when laid over a large area.

Additionally, this type of sports flooring is generally presented in rolls, adding logistical drawbacks, particularly due to the weight of the rolls and the relatively large surface area to cover for the intended application. Moreover, laying this type of flooring is complex and requires a high level of expertise from installers.

Document EP1570143 is also known, describing a sports flooring with a wood-based layer covered with varnish and comprising a resilient foam layer made from a thermoplastic. The flooring includes male/female assembly means on the periphery and is suitable for free installation.

This flooring may include a support layer that can be made, for example, of MDF, HDF, plywood, particleboard, wood, metal, or plastic.

This document combines different materials, such as wood and plastic, making its manufacturing and recyclability difficult. Although it is presented as a sports flooring, its shock absorption performance is not disclosed.

Finally, document EP1570143 does not offer any solution to limit the phenomena of expansion or contraction when laying the flooring over a large area.

SUMMARY

One of the objectives of the invention is to overcome the problems of the prior art by providing a sports flooring that can easily and temporarily or permanently convert an existing room into a sports room, capable of being "multipurpose," i.e., a room where multiple sports can be practiced, such as volleyball and handball, while still accommodating non-sporting events, without removing the flooring.

Another objective is to provide such flooring that meets the requirements defined in the NF EN 14904 standard of June 2006 in terms of shock absorption measured according to NF EN 14808, vertical deformation measured according to NF EN 14809, indentation measured according to EN 1516, and impact resistance measured according to EN 1517.

Another objective is to provide such flooring that meets the requirements defined in the NF EN ISO 11638 standard in terms of indentation resistance measured according to NF-EN ISO 24343-1.

An objective of the invention is to provide a flooring that exhibits shock absorption and indentation resistance performance equivalent to that of traditional sports flooring in roll form with glued installation and flooring for general-purpose buildings.

To this end, a sports flooring in the form of a tile or plank has been developed, with free installation, and comprising coupling means with an adjacent tile or plank.

According to the invention, the flooring includes successively, from top to bottom, and bonded together:

- a surface layer, preferably consisting of several layers, but including at least one flexible layer with a thickness between 0.1 mm and 2 mm and a compression modulus between 10 MPa and 100 MPa;
- a rigid intermediate layer, opposed to the flexible nature of the aforementioned layer, with a thickness between 3.5 mm and 7 mm and a flexural modulus between 1000 MPa and 10,000 MPa, preferably between 1000 MPa and 8000 MPa, to allow free installation of the flooring, as the intermediate layer should not be too flexible for easy handling of the flooring, nor too rigid to still allow cutting; the intermediate layer has a compression modulus between 35 MPa and 300 MPa; the dimensionally very stable rigid intermediate layer allows free installation, indentation resistance, impact resistance, rolling resistance, and enables at least partly the coupling means between the tiles or planks; a flexural modulus below 1000 MPa will decrease indentation resistance and potentially cause bulging in free installation, which is undesirable; a flexural modulus above 10,000 MPa makes on-site cutting difficult and may cause material whitening at the cut line; a flexural modulus below 8000 MPa is preferable to avoid cutting problems regardless of the on-site temperature;

a shock-absorbing underlayer for impact absorption and indentation resistance, with a thickness greater than 3 mm, typically between 3 mm and 10 mm, and preferably between 5 mm and 10 mm, with a compression modulus between 0.5 MPa and 15 MPa; the compression modulus should not be less than 0.5 MPa without degrading indentation resistance, nor more than 15 MPa without significantly reducing shock absorption.

From the above, the invention provides a free installation flooring, allowing easy and temporary or permanent conversion of an existing room into a sports and multi-purpose room.

The combination of compression moduli and thicknesses of the surface layer, the rigid intermediate layer, and the shock-absorbing underlayer contributes to good indentation resistance.

The combination of the compression modulus and the thickness of the shock-absorbing underlayer helps to allow the absorption of at least 25% of shocks to meet the requirements of the NF EN 14904 standard of June 2006, measured according to NF EN 14808.

The characteristics underlying the invention thus provide a good compromise between indentation resistance and shock absorption. It is also possible to install it without preparation, on a slightly deformed substrate, i.e., with no depressions greater than 2 mm over 2 m.

Preferably, the flexible layer is made from polyvinyl chloride, polyethylene, polypropylene, thermoplastic polyurethane, or linoleum.

To improve the shear resistance of the flooring, the flexible layer has a tensile modulus between 100 MPa and 1000 MPa.

The intermediate layer is preferably made from polyvinyl chloride, polyethylene, or polypropylene. To improve the shear resistance of the flooring, the intermediate layer has a tensile modulus between 500 MPa and 3000 MPa. The tensile modulus is measured according to CSTB 99030-01 technical document. The intermediate layer can be compact or foamed.

Depending on material compatibility, the intermediate layer is bonded to the underlayer through a bonding layer, such as double-sided adhesive, reactive polyurethane adhesive layer, co-polyester film (coPes), or hot-melt adhesive layer.

The intermediate layer preferably has a surface mass between 4 kg/m² and 9.5 kg/m².

The shock-absorbing underlayer is preferably made from foamed polyethylene, foamed PVC, foamed polyurethane, rubber, or cork. This underlayer preferably has a density between 90 kg/m³ and 400 kg/m³. This characteristic improves the shock absorption performance of the flooring according to the invention.

The shock-absorbing underlayer preferably has a surface mass between 390 g/m² and 1300 g/m².

The shock-absorbing underlayer preferably has an anti-slip coating on its surface facing the ground, for example, based on ethylene vinyl acetate.

The surface layer preferably has a surface mass between 100 g/m² and 3000 g/m², preferably between 100 and 800 g/m². The surface layer is preferably compact.

The coupling means of the flooring according to the invention can be of an appropriate type, such as receiving slots for a connection device, machined in the shock-absorbing underlayer, or in the surface layer, and in at least part of the thickness of the intermediate layer, as described in document FR3128478, the content of which is incorporated by reference.

According to another embodiment, the coupling means are of the male/female or hermaphrodite type, as described in documents FR3024990, FR3090711, FR3089534, FR3105280, the content of which is incorporated by reference, and are made at least in the thickness of the edges of the intermediate layer, complementarily on opposite or adjacent edges.

Preferably, in this embodiment, the underlayer extends horizontally from one edge of the intermediate layer and is set back at the complementary adjacent or opposite edge (i.e., at the edge including complementary coupling means) to extend under the surface layer and the intermediate layer of an adjacent flooring to which the said flooring is coupled, to limit mechanical stresses at the coupling means.

Regardless of the embodiment of the coupling means, the surface layer preferably has at least one beveled edge to limit unevenness between the surface layers of two adjacent tiles. The beveled edge also creates a recess for hot welding a joint between two adjacent tiles. The welding cord is made of a material similar or compatible with the composition of the surface layers and counteracts the effects of expansion between two tiles.

The sports flooring according to the invention preferably has a surface mass between 5 kg/m² and 13.3 kg/m², and more preferably between 7 kg/m² and 9 kg/m².

The sports flooring according to the invention has a thickness between 6.5 mm and 18 mm, preferably between 8 mm and 12 mm.

BRIEF DESCRIPTION OF THE DRAWINGS

FIG. 1 is a cross-sectional view of a particular embodiment of flooring according to the invention.

FIG. 2 is a view similar to that of FIG. 1, illustrating another embodiment.

FIG. 3 is a perspective view of the coupling means, illustrating the shock-absorbing underlayer extending from the edge of the intermediate layer and the surface layer.

FIG. 4 is a view similar to that of FIG. 3, in cross-section.

FIG. 5 is a perspective view illustrating an embodiment comprising a joint placed between two adjacent tiles or planks.

FIG. 6 is a perspective view illustrating an embodiment of a joint that can be placed between two adjacent tiles or planks.

FIG. 7 is a view similar to that of FIG. 5, in cross-section.

DETAILED DESCRIPTION

With reference to FIGS. 1 to 7, the invention relates to a sports flooring (1) in the form of a tile or plank, with free installation, allowing temporary or permanent conversion of an existing room into a "multipurpose" room and a sports hall, i.e., a room where multiple sports can be practiced, such as volleyball, handball, and accommodating non-sporting events, while ensuring compliance with the requirements of NF EN 14904 standard of June 2006 in terms of shock absorption, vertical deformation, indentation, and impact resistance, and the requirements of NF EN ISO 11638 standard measured according to NF-EN ISO 24343-1 in terms of indentation resistance.

The flooring (1) according to the invention provides optimal protection to users against potential injuries from repeated impacts during sports practice.

The invention is particularly suitable for continuous free installations, where the tiles or planks are contiguous, over large areas, especially over 100 m², even up to 1000 m², while reducing the effects of expansion/contraction phenomena. The tiles or planks generally have a width and length between 50 cm and 150 cm, preferably between 50 cm and 100 cm.

The invention also aims to maintain the total thickness of the sports flooring (1) between 6.5 mm and 18 mm, preferably between 8 mm and 11 mm, while ensuring a total surface mass between 5 kg/m² and 13.3 kg/m², ideally between 7 kg/m² and 9 kg/m². These dimensions and weight ensure both portability and durability of the flooring (1).

The sports flooring (1) is in the form of a tile or plank with free installation and includes coupling means (6) to link adjacent tiles or planks.

The flooring (1) includes at least a surface layer (2), a rigid intermediate layer (3), and a shock-absorbing underlayer (5) intended to be in contact with the ground, bonded together in this order, from top to bottom.

The surface layer (2) includes at least one flexible layer (2a) with a thickness between 0.1 mm and 2 mm and a compression modulus between 10 MPa and 100 MPa, measured according to EN ISO 604 standard with v=20 mm/min, and a tensile modulus between 100 MPa and 1000 MPa, measured according to CSTB 99030-01 technical document. The surface layer (2) is preferably compact. A surface layer (2) thickness between 0.1 and 2 mm, preferably between 1 and 2 mm, helps to reduce the force of an impact.

This layer can be made from various materials, such as PVC, particularly plasticized PVC, PE, PP, TPU, or linoleum, by known processes such as calendaring, coating, extrusion, or pressing. It is designed to be sufficiently wear-resistant and possibly non-slip. The surface layer (2) can be either a single layer or a combination of a flexible (2a) transparent layer with a decorative film (2b). It may be traditionally varnished. The transparent flexible layer (2a) generally has a thickness between 0.15 and 1.95 mm, preferably between 1 and 1.95 mm. The decorative film (2b) can be printed by gravure or inkjet printing. For example, the transparent surface layer (2) contains 27% by weight of plasticizer, 70% by weight of PVC, and 3% by weight of other additives.

The rigid intermediate layer (3) has a thickness between 3.5 mm and 7 mm, a flexural modulus between 1000 MPa and 10,000 MPa, measured according to NF EN ISO 178 standard, preferably between 1000 MPa and 8000 MPa, and preferably a compression modulus between 35 MPa and 300 MPa, measured according to EN ISO 604 standard with v=20 mm/min, and a tensile modulus between 500 MPa and 3000 MPa, measured according to CSTB 99030-01 technical document. This layer, which can be made from PVC, PE, or PP, contributes to impact absorption and provides structural stability to the entire flooring (1). This rigid intermediate layer (3) can be made by extrusion or calendaring. For example, it can be made from PVC with fillers and plasticized at less than 10% by total weight of the layer, preferably at less than 5% by total weight of the layer.

The fillers can be chosen from the group including calcium carbonate, chalks, kaolin, talc, silica. The intermediate layer (3) may also contain at least one additive chosen from the following group: thermal stabilizers, desiccants, lubricants, processing aids, pigments, flame retardants.

Plasticizers can be chosen from Diisononyl Phthalate (DINP), Diisodecyl Phthalate (DIDP), 2-Ethylhexyl Diphenyl Phosphate (DPO), Dioctyl Terephthalate (DOTP), 1,2-cyclohexane dicarboxylic acid diisononyl ester (DINCH), plasticizers from the benzoate family, plasticizers from the adipate family, plasticizers marketed under the PEVALEN® brand by Perstorp, epoxidized soybean oil (ESO), epoxystearate octyl (ESO), partially or fully bio-based plasticizers such as Polysorb® exelD 37 marketed by Roquette Pharma, plasticizers from the Citrofol® range marketed by Jungbunzlauer International AG, or Soft-n-Safe® plasticizers marketed by Danisco. Liquid plasticizers can be used alone or in mixtures.

For example, the rigid intermediate layer (3) can be made from a composition containing 55% fillers, 43% PVC, 0.3% blowing agents, and 2.7% other additives, without added plasticizers.

The shock-absorbing underlayer (5) is designed to absorb most impacts, reduce impact force, and resist indentation. This layer has a thickness greater than 3 mm, ideally between 3 mm and 10 mm, and a compression modulus between 0.5 MPa and 15 MPa, measured according to EN ISO 604 standard with v=20 mm/min. It can be made from foamed PE, foamed PVC, foamed PU, rubber, or cork, by extrusion or coating processes, such as coating expanded PVC plastisol. Foaming can be achieved mechanically or using blowing agents. Preferably, the underlayer (5) has a closed-cell foam composition, more preferably cross-linked. For example, the foam used contains 30% by weight of plasticizer, 8% by weight of filler, 57% by weight of polyvinyl chloride, and 5% by weight of other additives.

According to a particular embodiment, the sports flooring (1) includes a bonding layer (4), such as double-sided adhesive, reactive polyurethane adhesive layer, co-polyester film (coPes), or hot-melt adhesive layer, positioned to bond the intermediate layer (3) and the underlayer (5).

Additionally, the flooring (1) includes coupling means (6), which can be receiving slots for a connection device, as illustrated in document FR3128478, machined from the surface layer (2), or preferably from the shock-absorbing underlayer (5), and in at least part of the thickness of the intermediate layer (3).

The connection device can have a joint (8) that fits between the tiles or planks and improves resistance to expansion for installations over areas of 100 m² or more.

In the embodiment shown in FIGS. 3, 4, 5, and 7, these coupling means (6) can be of the male/female or hermaphrodite type, made at least in the thickness of the edges of the intermediate layer (3), complementarily on opposite or adjacent edges.

The coupling means (6) allow linking multiple tiles or planks together. Generally, male/female coupling means (6) include a first machined profile, such as a tongue, machined on one edge and configured to couple with a complementary second machined profile, such as a groove, machined on an opposite or adjacent edge of an adjacent flooring (1') or joint (8).

Regardless of the form of the coupling means (6), the surface layer (2a) preferably has at least one beveled edge (7) to limit unevenness between the surface layers of two adjacent tiles (1, 1'). The beveled edge (7) also creates a recess for hot welding a joint using a welding cord between two adjacent tiles. The welding cord is made from a material similar or compatible with the composition of the surface layers and counteracts the effects of expansion between two tiles (1, 1', 1").

According to FIGS. 3 and 4, the underlayer (5) extends horizontally from one edge of the intermediate layer (3) and is set back at the complementary adjacent or opposite edge so as to extend under the surface layer (2) and the intermediate layer (3) of an adjacent flooring (1) to which the said flooring (1) is coupled, to limit mechanical stresses at the coupling means. The extension and setback values are identical and preferably between 10 mm and 50 mm, more preferably between 20 and 40 mm.

Once coupled, the coupling means (6) lock the displacement of two tiles or planks both in a vertical direction, i.e., perpendicular to the floor, and horizontal direction, i.e., parallel to the floor plane.

According to FIGS. 5 and 7, the sports flooring (1) is in the form of a tile or plank with free installation, and includes on its four edges coupling means (6) male as described in patent FR3024990 and allowing assembly with a joint (8) whose profile includes corresponding female assembly means (6), as described in patent FR3024990. The underlayer (5) is set back horizontally relative to the surface layer (2a) and the intermediate layer (3) to create a space between two adjacent floorings (1, 1') where the joint (8) fits.

According to FIGS. 6 and 7, the joint (8) has a profile including on both sides female assembly means (6) as described in patent FR3024990. When assembling multiple tiles or planks (1, 1', 1"), the surface of the tiles or planks is flush with the upper face (9) of the joint (8). The lower face (10) of the joint (8) rests on the ground to ensure good assembly strength. A joint (8) can be made by extrusion or other processes. Its composition can be made from PVC, rubber, silicone, nitrile, or other equivalent elastomers, possibly with a metal reinforcement.

Tests and measurements were carried out on an example of the invention, as described in the table below. The structure of the layers bonded together to form the flooring is defined in the first column.

TABLE 1

| Structure | Weight g/m² | Thickness Mm | Flexural Modulus MPa | Compression Modulus MPa | Tensile Modulus MPa |
|---|---|---|---|---|---|
| PUR varnish | 25 | 0.025 | / | / | / |
| Transparent PVC wear layer | 620 | 0.5 | / | 14.2 | 453.8 |
| Printed PVC decorative film | 90 | 0.12 | / | / | / |
| Extruded or calendered filled PVC intermediate layer (3) | 5468 | 4.15 | 4444.4 | 80.8 | 807.9 |
| Hot-melt EVA-based adhesive bonding layer (4) | 55 | 0 | / | / | / |

8

TABLE 1-continued

| Structure | Weight g/m² | Thickness Mm | Flexural Modulus MPa | Compression Modulus MPa | Tensile Modulus MPa |
|---|---|---|---|---|---|
| Closed-cell cross-linked polyethylene foam shock-absorbing underlayer (5) | 650 | 5 | / | 9 | / |

The flexural modulus is indicative of ease of installation, particularly free installation.

The compression modulus is indicative of indentation resistance.

The tensile modulus is indicative of shear resistance of the flooring (1).

The test and measurement results are compiled in the table below

TABLE 2

| Property | Methods | Units | Results | Requirements | Opinion |
|---|---|---|---|---|---|
| Shock absorption | EN 14808 | % | 27 −1/0 | 25-75 +/−5 of the average | Compliant |
| Vertical deformation | EN 14809 | mm | 0.50 | ≤5.0 | Compliant |
| Indentation | EN 1516 | mm | 0.04 | ≤0.5 | Compliant |
| Impact resistance | EN 1517 | / | No degradation | No degradation | Compliant |
| Indentation | NF-EN ISO 24343-1 | mm | 0.14 mm | ≤0.2 mm to 2 h 30 | Compliant |

What is claimed is:

1. A sports flooring in the form of a tile or plank with free installation and including a coupling with an adjacent tile or plank, comprising successively, from top to bottom, and bonded together:

a surface layer including at least one flexible layer with a thickness between 0.1 mm and 2 mm and a compression modulus between 10 MPa and 100 MPa;

a rigid intermediate layer with a thickness between 3.5 mm and 7 mm and a flexural modulus between 1000 MPa and 10,000 MPa, and a compression modulus between 35 MPa and 300 MPa; and a shock-absorbing underlayer with a thickness greater than 3 mm, and a compression modulus between 0.5 MPa and 15 MPa.

2. The sports flooring according to claim 1, wherein the flexible layer has a tensile modulus between 100 MPa and 1000 MPa.

3. The sports flooring according to claim 1, wherein the intermediate layer has a tensile modulus between 500 MPa and 3000 MPa.

4. The sports flooring according to claim 1, wherein the intermediate layer is bonded to the underlayer through a bonding layer.

5. The sports flooring according to claim 1, wherein the intermediate layer has a surface mass between 4 kg/m² and 9.5 kg/m².

6. The sports flooring according to claim 1, wherein the underlayer has a density between 90 kg/m³ and 400 kg/m³.

7. The sports flooring according to claim 1, wherein the coupling receives slots for a connection device, machined in the shock-absorbing underlayer, or in the surface layer, and in at least part of the thickness of the intermediate layer.

8. The sports flooring according to claim 1, wherein the coupling is of the male/female or hermaphrodite type, made at least in the thickness of the edges of the intermediate layer, complementarily on opposite or adjacent edges.

9. The sports flooring according to claim 8, wherein the underlayer extends horizontally from one edge of the intermediate layer and is set back at the complementary adjacent or opposite edge to extend under the surface layer and the intermediate layer of an adjacent flooring to which the said flooring is coupled.

10. The sports flooring according to claim 1, wherein the sports flooring has a surface mass between 5 kg/m$^2$ and 13.3 kg/m$^2$.

11. The sports flooring according to claim 1, the thickness of the shock-absorbing underlayer is between 3 mm and 10 mm.

12. The sports flooring according to claim 1, the thickness of the shock-absorbing underlayer is between 5 mm and 10 mm.

13. The sports flooring according to claim 4, wherein the bonding layer is selected from the group consisting of double-sided adhesive, reactive polyurethane adhesive layer, co-polyester film, and hot-melt adhesive layer.

14. The sports flooring according to claim 1, wherein the sports flooring has a surface mass between 7 kg/m$^2$ and 9 kg/m$^2$.

\* \* \* \* \*